(12) United States Patent
Hammerum et al.

(10) Patent No.: US 10,697,431 B2
(45) Date of Patent: Jun. 30, 2020

(54) CONTROL OF A WIND TURBINE TAKING NOISE INTO ACCOUNT

(71) Applicant: VESTAS WIND SYSTEMS A/S, Aarhus N (DK)

(72) Inventors: Keld Hammerum, Hadsten (DK); Tobias Gybel Hovgaard, Ry (DK); Erik Sloth, Rønde (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/091,365

(22) PCT Filed: Apr. 3, 2017

(86) PCT No.: PCT/DK2017/050103
§ 371 (c)(1),
(2) Date: Oct. 4, 2018

(87) PCT Pub. No.: WO2017/174089
PCT Pub. Date: Oct. 12, 2017

(65) Prior Publication Data
US 2019/0154000 A1    May 23, 2019

(30) Foreign Application Priority Data

Apr. 7, 2016 (DK) .................................. 2016 70209

(51) Int. Cl.
*F03D 7/02* (2006.01)
*F03D 7/04* (2006.01)
(52) U.S. Cl.
CPC ........... *F03D 7/0296* (2013.01); *F03D 7/045* (2013.01); *F05B 2270/333* (2013.01); *F05B 2270/404* (2013.01); *Y02E 10/723* (2013.01)

(58) Field of Classification Search
None
See application file for complete search history.

(56) References Cited

U.S. PATENT DOCUMENTS 7,822,560 B2 * 10/2010 LeMieux ................ F03D 7/042
                                                                290/44
8,237,301 B2    8/2012 Delmerico et al.
8,332,077 B2   12/2012 Kondo et al.
(Continued)

FOREIGN PATENT DOCUMENTS

CN   101247049 A    8/2008
CN   101560950 A   10/2009
(Continued)

OTHER PUBLICATIONS

Danish Patent and Trademark Office First Technical Examination for Application No. PA 2016 70209 dated Nov. 8, 2016.
(Continued)

*Primary Examiner* — Ramesh B Patel
(74) *Attorney, Agent, or Firm* — Patterson + Sheridan, LLP

(57) ABSTRACT

The present invention relates to control of wind turbines where a noise measure is taken into account. Control of a wind turbine is described where a control trajectory is calculated based on noise measure, the noise measure being determined from a predicted operational trajectory. In embodiments the predicted operational trajectories are calculated by using a model predictive control (MPC) routine.

19 Claims, 4 Drawing Sheets

(56) References Cited

U.S. PATENT DOCUMENTS

| | | | |
|---|---|---|---|
| 8,489,247 B1* | 7/2013 | Engler | F01D 17/24 |
| | | | 700/291 |
| 8,853,877 B1 | 10/2014 | Zalar et al. | |
| 10,267,291 B2 | 4/2019 | Hammerum et al. | |
| 10,337,497 B2 | 7/2019 | Hammerum et al. | |
| 2003/0168864 A1 | 9/2003 | Heronemus et al. | |
| 2003/0170123 A1 | 9/2003 | Heronemus | |
| 2006/0113801 A1 | 6/2006 | Schubert et al. | |
| 2007/0104318 A1 | 5/2007 | Schwarz | |
| 2008/0086281 A1* | 4/2008 | Santos | F03D 7/0292 |
| | | | 702/127 |
| 2009/0102195 A1 | 4/2009 | Altemark et al. | |
| 2009/0180875 A1* | 7/2009 | Egedal | F03D 7/0292 |
| | | | 416/43 |
| 2010/0283246 A1 | 11/2010 | Christensen | |
| 2011/0144816 A1 | 6/2011 | Morjaria et al. | |
| 2012/0049516 A1 | 3/2012 | Viassolo | |
| 2012/0051939 A1 | 3/2012 | Marvin et al. | |
| 2012/0104753 A1 | 5/2012 | Nakashima et al. | |
| 2012/0104756 A1 | 5/2012 | Beekmann et al. | |
| 2012/0313742 A1 | 12/2012 | Kurs | |
| 2013/0035798 A1* | 2/2013 | Zhou | F03D 7/0292 |
| | | | 700/287 |
| 2013/0106107 A1* | 5/2013 | Spruce | F03D 7/0224 |
| | | | 290/44 |
| 2013/0127173 A1 | 5/2013 | Lee et al. | |
| 2013/0257051 A1 | 10/2013 | Spruce et al. | |
| 2013/0259686 A1 | 10/2013 | Blom et al. | |
| 2013/0297266 A1 | 11/2013 | Brincker | |
| 2014/0178195 A1 | 6/2014 | Blom et al. | |
| 2014/0248123 A1* | 9/2014 | Turner | F03D 7/0292 |
| | | | 415/1 |
| 2016/0032892 A1* | 2/2016 | Herrig | F03D 7/0296 |
| | | | 416/1 |
| 2016/0032894 A1* | 2/2016 | Ambekar | F03D 7/0296 |
| | | | 416/1 |
| 2016/0053745 A1 | 2/2016 | Blom et al. | |
| 2016/0108736 A1 | 4/2016 | Schuring | |
| 2016/0146190 A1 | 5/2016 | Ravindra et al. | |
| 2017/0051723 A1 | 2/2017 | Kjaer et al. | |
| 2017/0089325 A1 | 3/2017 | Timbus et al. | |
| 2018/0012137 A1* | 1/2018 | Wright | G05B 13/0265 |
| 2018/0100488 A1* | 4/2018 | Miranda | F03D 7/045 |
| 2018/0142674 A1* | 5/2018 | Hammerum | F03D 7/0292 |
| 2018/0171977 A1 | 6/2018 | Kjaer et al. | |
| 2018/0266392 A1* | 9/2018 | Hovgaard | F03D 7/028 |

FOREIGN PATENT DOCUMENTS

| | | |
|---|---|---|
| CN | 102317622 A | 1/2012 |
| CN | 102536657 A | 7/2012 |
| CN | 102619685 A | 8/2012 |
| CN | 102725520 A | 10/2012 |
| CN | 102797631 A | 11/2012 |
| CN | 103216383 A | 7/2013 |
| CN | 103291551 A | 9/2013 |
| CN | 203552029 U | 4/2014 |
| CN | 204082445 U | 1/2015 |
| CN | 104533714 A | 4/2015 |
| DK | 201570721 A1 | 11/2015 |
| EP | 2302208 A1 | 3/2011 |
| EP | 2461025 A2 | 6/2012 |
| EP | 2541052 A1 | 1/2013 |
| EP | 2541053 A1 | 1/2013 |
| EP | 2644887 A2 | 10/2013 |
| EP | 2644888 A2 | 10/2013 |
| EP | 2743500 A1 | 6/2014 |
| EP | 2746576 A2 | 6/2014 |
| EP | 2784303 A1 | 10/2014 |
| EP | 2798198 A1 | 11/2014 |
| EP | 2878811 A1 | 6/2015 |
| GB | 2443886 A | 5/2008 |
| GB | 2476316 A | 6/2011 |
| KR | 101545839 B1 | 8/2015 |
| WO | 2006037576 A1 | 4/2006 |
| WO | 2008043762 A1 | 4/2008 |
| WO | 2010037387 A2 | 4/2010 |
| WO | 2011000453 A2 | 1/2011 |
| WO | 2011035976 A1 | 3/2011 |
| WO | 2012136277 A1 | 10/2012 |
| WO | 2013028172 A1 | 2/2013 |
| WO | 2014114295 A1 | 7/2014 |
| WO | 2014121974 A1 | 8/2014 |
| WO | 20140121800 A1 | 8/2014 |
| WO | 2016023560 A1 | 2/2016 |
| WO | 2016150447 A1 | 9/2016 |

OTHER PUBLICATIONS

PCT International Search Report for Application No. PCT/DK2017/050103 dated Jun. 7, 2017.

Written Opinion of the International Searching Authority for Application No. PCT/DK2017/050103 dated Jun. 7, 2018.

Chinese Office Action for Application No. 201780034800.7 dated Sep. 16, 2019.

International Search Report for PCT/DK2015/050238, dated Oct. 22, 2015.

Danish Search Report for PA 2014 70492, dated Mar. 12, 2015.

Arne Koerber et al: "Combined Feedback Feed Forward Control of Wind Turbines Using State-Constrained Model Predictive Control", IEEE Transactions on Control Systems Technology, IEEE Service Center, New York, NY, US, vol. 21, No. 4, Jul. 1, 2013(Jul. 1, 2013), pp. 1117-1128.

International Search Report for PCT/DK2015/050239, dated Oct. 22, 2015.

Danish Search Report for PA 2014 70491, dated Mar. 10, 2015.

Danish Patent and Trademark Office, Search Report, Danish Application No. PA 2015 70162 dated Sep. 21, 2015.

Patent Cooperation Treaty, International Search Report, Application No. PCT/DK2016/050087 dated Jun. 8, 2016.

Chinese Office Action for Application No. 201680023698.6 dated Oct. 22, 2018.

Jose de Jesus Barradas-Berglind, Rafael Wisniewski and Mohsen Soltani, "Fatigue damage estimation and data-based control for wind turbines," Received on Jun. 29, 2014, Revised on Oct. 3, 2014, Accepted on Nov. 21, 2014; www.ietdl.org, 10 pages.

International Search Report for Application No. PCT/01<2016/050143, dated Aug. 5, 2016.

Danish Search Report for Application PA 2015 70315, dated Dec. 17, 2015.

Patent Cooperation Treaty International Search Report for Application No. PCT/DK2016/050319 dated Dec. 14, 2016.

Baccion, et al., "An Optimal Model-Based Control Technique to Improve Wind Farm Participation to Frequency Regulation," IEEE Transactions on Sustainable Energy, vol. 6, No. 3, Jul. 2015, 12 pages.

Hovgaard et al., "MPC for Wind Power Gradients-Utilizing Forecasts, Rotor Inertia, and Central Energy Storage," 2013 European Control Conference (ECC), Jul. 17-19, 2013, 6 pages.

Danish Patent and Trademark Office Search Opinion for Application No. PA 2015 70641 dated May 18, 2016.

Chinese Office Action for Application No. 2016800655833 dated Apr. 12, 2019.

Chinese Office Action for Application No. 2017800266 dated Aug. 20, 2019.

L. C. Henriksen, M. H. Hansen and N. K. Poulsen, "Wind turbine control with constraint handling: a model predictive control approach," in IET Control Theory & Applications, vol. 6, No. 11, pp. 1722-1734, Jul. 19, 2012. (Year 2012).

\* cited by examiner

CONTROL OF A WIND TURBINE TAKING NOISE INTO ACCOUNT

FIELD OF THE INVENTION

The present invention relates to control of wind turbines where a noise measure is taken into account.

BACKGROUND OF THE INVENTION

In general, a wind turbine or a wind turbine park is operated with the aim to obtain maximum yield of the capital invested in it, and consequently the wind turbine control systems are configured to maximize the output power, i.e. to operate the wind turbine to capture the maximal power that is available in the wind, with due regard to keeping the wind turbine within operational limits.

When a wind turbine is running it generates noise. This may be problematic for neighbours of the wind turbines. The noise emitted from a wind turbine has two main contributions: noise produced by the machine part of the wind turbines (e.g. the gear box and the generator), and aerodynamic sound due to the air flow across the rotor blades.

Generally, noise generation depends on the specific operational parameter settings. However atmospheric conditions are important in relation to propagation of noise in the surroundings. Also such factors as time of day may be important as to how sensitive the surroundings are to noise.

To handle noise emissions turbine operation is subjected to comply with noise regulation in many countries around the world. Such noise regulation may vary somewhat from country to country.

SUMMARY OF THE INVENTION

It would be advantageous to control a wind turbine in a manner which takes into account a predicted noise measure during the operation of the wind turbine, and which uses the actual operational state in connection with continued operation of the wind turbine in order to determine the predicted noise measure.

Accordingly, in a first aspect, there is provided a method of controlling a wind turbine, comprising:
  receiving a current operational state of the wind turbine;
  based on the current operational state, calculate one or more predicted operational trajectories, the one or more predicted operational trajectories include a predicted control trajectory, where a trajectory comprises a time series of at least one variable;
  determine at least one noise measure from at least one predicted operational trajectory;
  determine a control trajectory based on the at least one noise measure; and
  control the wind turbine based on the control trajectory.

In the present invention, the operation of the turbine is based on a calculated control trajectory. A trajectory is a time series of a variable for a given time slot, which includes the next variable value for the operational parameter related to the variable, as well as a predicted or an expected number of future variable values for the given parameter. For example, the control trajectory may be a pitch trajectory which includes the next pitch command, as well as an expected or a predicted number of future pitch commands.

A wind turbine includes a control system for controlling the various components of the wind turbine, such as the blade pitch setting, the power converter set-points, the yaw motors, etc. The level of generated noise depends on the imposed control actions.

In the present invention, the control system is arranged for determining at least one noise measure from at least one predicted operational trajectory, i.e. the control system is arranged to determine a predicted noise measure based on the actual operational state and a predicted operation in a future time slot and control the wind turbine based on such predicted or expected noise measure.

This is an advantage since the expected noise impact of the surroundings can be taken into account in the control of the wind turbine directly during the actual operation and based on the actual conditions. The noise impact can be taken into account, not just for current operational settings of the wind turbine, but for the entire duration of predicted operational trajectory.

In important embodiments, the predicted operational trajectories are calculated by optimizing at least one cost function, and wherein the at least one noise measure is included in the cost function and/or as one or more constraints used for the optimization.

Compliance with noise regulation is often a trade-off between how close to the noise limits the turbine is operated and how much the power output is reduced. Since in most situations, any measures taken to reduce noise generation will reduce the power output, as the turbine needs to be run less aggressive.

Such trade-off can advantageously be handled by including a noise measure in a cost function or as a properly set constraint, since by properly constructed cost functions and/or constraints the math will handle the trade-off in the optimization process.

In important embodiments, the one or more predicted operational trajectories are calculated by using a receding horizon control routine, such as a model predictive control (MPC) routine, in such embodiments, the noise measure may advantageously be calculated in the prediction horizon.

Further embodiments are described in connection with the section Description of embodiments.

In a second aspect, the invention also relates to a method of controlling a wind power plant comprising a plurality of wind turbines, comprising:
  selecting at least one wind turbine of the plurality of wind turbines;
  receiving a current operational state of the selected wind turbine;
  based on the current operational state, calculate one or more predicted operational trajectories for the selected wind turbine, the one or more predicted operational trajectories include a predicted control trajectory, where a trajectory comprises a time series of at least one variable;
  determine at least one noise measure from at least one predicted operational trajectory of the selected wind turbine;
  determine a control trajectory based on the at least one noise measure; and
  control the wind turbine based on the control trajectory.

In this aspect, embodiments of the invention relate to noise handling in a wind power plant.

In further aspects there are provided a control system for a wind turbine, comprising a controller for carrying out the method of the first aspect, and a wind power plant controller arranged for controlling at least a selected wind turbines in accordance with the method of the second aspect.

In general, a controller may be a unit or collection of functional units which comprises one or more processors, input/output interface(s) and a memory capable of storing instructions that can be executed by a processor.

Aspects of the invention may be implemented by a computer program product comprising software code adapted to control a wind turbine when executed on a data processing system, to a controller for a wind turbine, to a wind turbine park controller which is implemented to control at least selected turbines of the wind turbine park.

Moreover, the invention relates to a wind turbine or collection of wind turbines being controlled in accordance with any of the various aspects of the present invention.

In general the various embodiments and aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
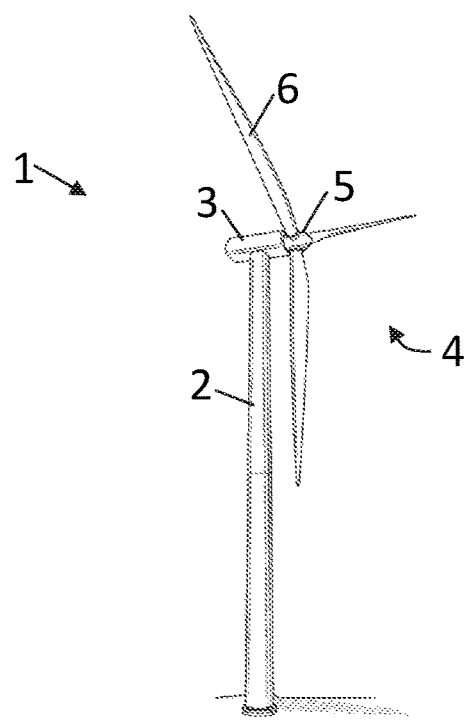
FIG. 1 illustrates a schematic example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outward from the central hub 5. In the illustrated embodiment, the rotor 4 includes three blades 6, but the number may vary. Moreover, the wind turbine comprises a control system. The control system may be placed inside the nacelle or distributed at a number of locations inside the turbine and communicatively connected.

Figure 2:
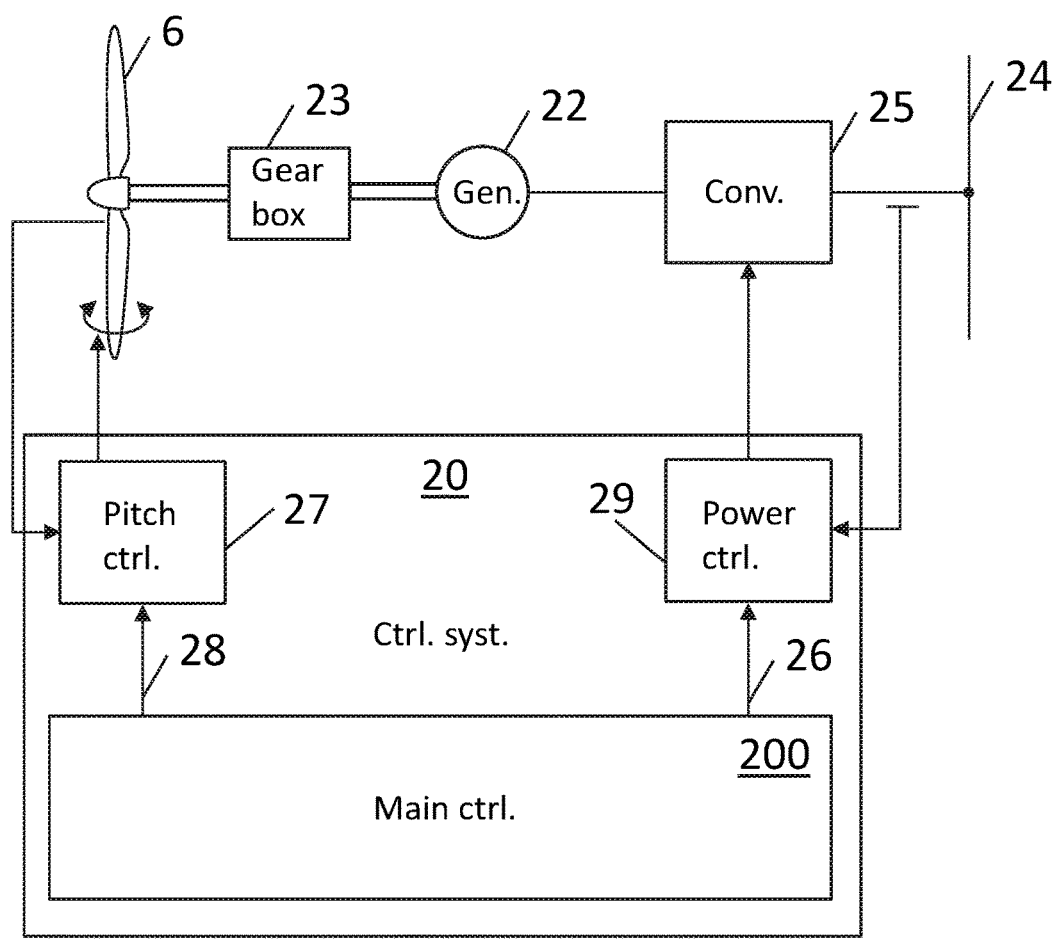
FIG. 2 illustrates an example embodiment of a control system together with elements of a wind turbine.

FIG. 2 schematically illustrates an embodiment of a control system 20 together with example elements of a wind turbine. The wind turbine comprises rotor blades 6 which are mechanically connected to an electrical generator 22 via gearbox 23. The electrical power generated by the generator 22 is injected into a power grid 24 via an electrical converter 25. The electrical generator 22 and the converter 25 may be based on a full scale converter (FSC) architecture or a doubly fed induction generator (DFIG) architecture, but other types may be used.

The control system comprises a number of elements, including at least one main controller 200 with a processor and a memory, so that the processor is capable of executing computing tasks based on instructions stored in the memory. In general, the wind turbine controller ensures that in operation the wind turbine generates a requested power output level. This is obtained by adjusting the pitch angle and/or the power extraction of the converter. To this end, the control system comprises a pitch system including a pitch controller 27 using a pitch reference 28, and a power system including a power controller 29 using a power reference 26. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades.

In embodiments of the invention, the main controller 200 is programmed to receive a current operational state of the wind turbine. Based on the current operational state, one or more predicted operational trajectories are calculated and at least one noise measure is determined from at least one predicted operational trajectory. A control trajectory is determined based on the noise measure; and the wind turbine controlled based on the determined control trajectory.

In embodiments, the predicted operational trajectories and the predicted control trajectories are calculated using a model predictive control (MPC) routine.

Figure 3:
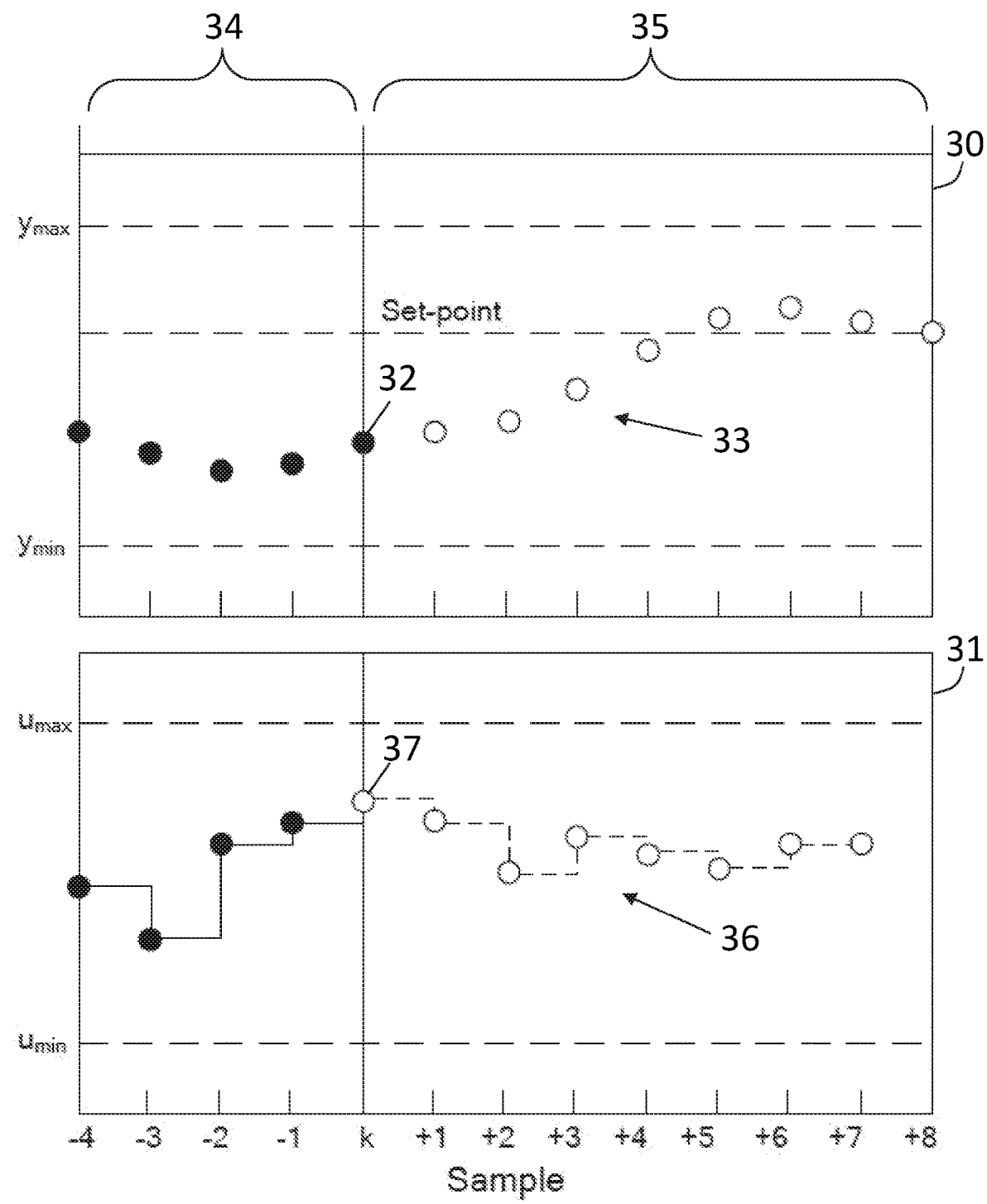
FIG. 3 shows general aspects of an MPC routine in relation to operational trajectories.

FIG. 3 shows general aspects of an MPC routine in relation to a measured operational variable y and an MPC calculated control variable u. The upper part 30 of the figure shows a state trajectory for the variable y and the lower part 31 of the figure shows a control trajectory for the control variable u.

The operational trajectories and control trajectories may include, but are not limited to, one or more of the following parameters: pitch value, including collective pitch values and individual pitch values, rotor speed, rotor acceleration, tower movement, power related parameters, torque related parameters and derivatives of these parameters.

In an embodiment, the operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, $\theta$, rotor angular speed, $\omega$, and tower top position, $s$, as well as time derivatives of those parameters. Other and more parameters may be used to define the wind turbine state, $x^*$. In general the operational trajectory includes operational parameters which are used to calculate the desired fatigue load measure.

The state values of the current operational state of the wind turbine may be based on measured sensor readings from sensors arranged to measure sensor data relating to the wind turbine's physical state values. Additionally, estimated values or calculated values may also be used. In an embodiment, the state may be determined by a state calculator, e.g. in the form of a dedicated computational unit in charge of determining the current operational state, such as an observer or a Kalman filter.

The trajectory may also be expressed as a control trajectory. An example control trajectory may be:

$$u_1^* = \begin{bmatrix} \theta_{ref} \\ P_{ref} \end{bmatrix}$$

comprising the pitch reference signal and the power reference signal. Other and more parameters may be used to define the wind turbine control signal, $u_1^*$.

FIG. 3 shows a trajectory 33 of a measured variable y for a number of discrete time steps. The figure shows the current time, k, as well as a number of past time steps 34 and a number of future time steps 35 (also referred to as the prediction horizon and the control horizon for the state variable y and the control variable u, respectively). Known variable values, i.e. based on already measured values, are marked with a solid circle, whereas predicted variable values are marked with an open circle. A trajectory may comprise a time series of predicted values, i.e. only the open circles. The trajectory need not include the past and known values, but may do in certain embodiments. In particular, the current value 32 may be included for trajectories of measured variables. The trajectory may span a time series of a few seconds, such as 5-10 seconds. However the trajectory may be longer or shorter depending on the given implementation.

As an example, the trajectory shows the rotor speed ω in a situation where a set-point is given to increase the rotor speed. The trajectory shows the current rotor speed 32 together with the predicted future rotor speeds. Allowed maximum and minimum values are also shown for the illustrated variable.

FIG. 3 further illustrates an example of a general control trajectory 36 determined by use of an MPC algorithm. FIG. 3 illustrates the relationship between an operational state trajectory 33 and a general control trajectory 36.

While the current k-th value is known for measured variables 32, the current value 37 of the control trajectory is calculated by use of the MPC routine.

The figure also shows maximum and minimum allowed values for the control trajectory values of u.

As an example, the trajectory shows the trajectory for the pitch angle, i.e. u=θ. Thus a set-point is given to increase the rotor speed, and as a consequence the pitch angle is lowered. The trajectory shows the next pitch setting 37 together with the predicted future pitch settings to fulfil the new set-point setting.

MPC is based on iterative, finite horizon optimization. At time t the current state is sampled and a cost minimizing control strategy is computed for a time horizon in the future: [t, t+T]. Only the first predicted value for the current sample k is used in the control signal, then the turbine state is sampled again and the calculations are repeated starting from the new current state, yielding a new control trajectory and new predicted state trajectory. The prediction horizon keeps being shifted forward and for this reason MPC is a receding horizon controller.

Model Predictive Control (MPC) is a multivariable control algorithm that uses an optimization cost function J over the receding prediction horizon, to calculate the optimal control moves.

The optimization cost function may be given by:

$$J = \sum_{i=1}^{N} w_{yi}(r_i - y_i)^2 + w_{u_i}\Delta u_i^2 + \rho n(u, y) \qquad \text{Eq. (1)}$$

With reference to FIG. 3, $r_i$ is the set-point for the i-th variable, $y_i$ and $u_i$ being i-th trajectory variables, and $w_{y_i}$ being weight matrix defining the relative importance of this variable, and $w_{u_i}$ being weight matrix defining the penalty related to changes in this variable.

In the above cost function the noise measure is included in the cost function as a weighted element by the function ρ n (u, y). The weight ρ may be used to set the importance of the noise measure function in the optimization process.

In an embodiment, the noise measure used in connection with the optimization of the cost function may be defined as the sound power, $L_{wA}$.

$$\rho n(u,y) = \rho L_{wA}(u,y) = \rho(f(\theta) + g(\omega)) \qquad \text{Eq. 2}$$

The sound power $L_{wA}$ can be expressed as a functional expression which takes into account the pitch angle and the rotor speed. The pitch angle may be taken into account by a function, $f(\theta)$ and the rotor speed may be handled by a function $g(\omega)$.

Figure 4:
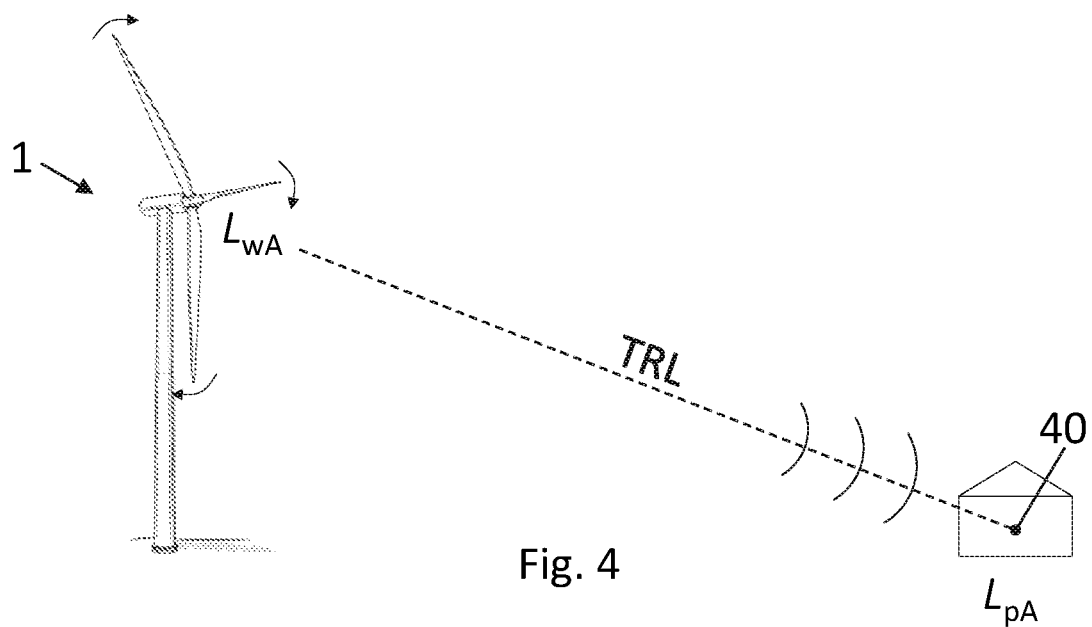
FIG. 4 schematically illustrates the relationship between generated turbine sound power and sound pressure in a given immission point.

FIG. 4 schematically illustrates that the sound power $L_{wA}$ generated by the wind turbine 1 can be expressed as a sound pressure $L_{pA}$ in a given immission point 40 by use of a transmission loss model, or a transmission loss function, TRL. Specific transmission loss models are defined in technical standards. One example of such standard is the ISO 9613-2 standard.

Figure 5:
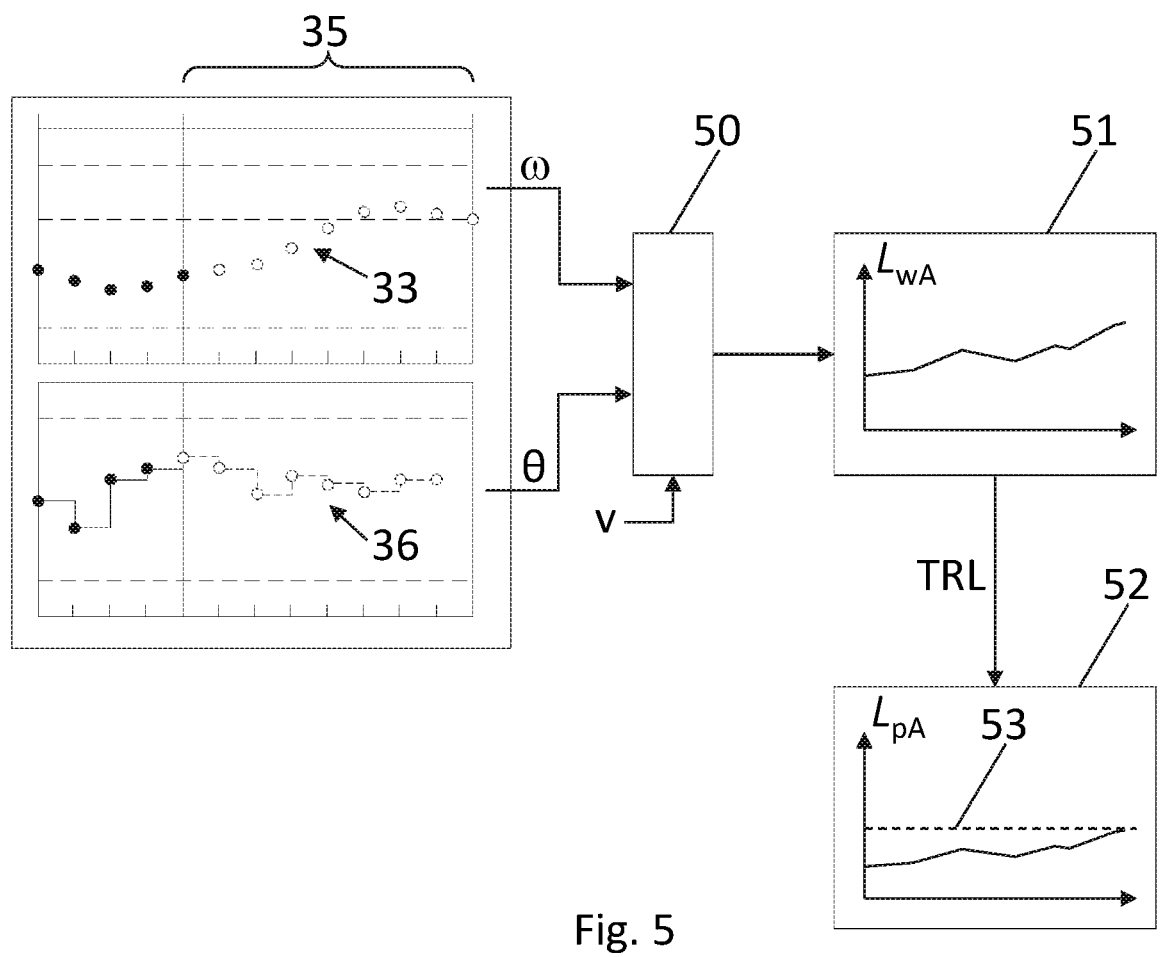
FIG. 5 illustrates an example diagram of a determination of the noise measure from receding horizon trajectories.

FIG. 5 illustrates an example diagram showing an embodiment of a determination of a noise measure, here generated sound power $L_{wA}$ and sound pressure $L_{pA}$ from determined receding horizon trajectories.

In FIG. 3 the prediction horizon 35 of operational trajectories 33, 36 were illustrated for the rotor speed 33 and for the pitch angle 36. These predicted future operational values can be input into a calculating unit 50, possibly together with other input variables, such as the wind speed, v, in order to determine the predicted noise level over the prediction horizon. Here exemplified as the predicted generated sound power over the prediction horizon 51. In this manner, a noise measure is determined for the prediction horizon.

By use of a transmission loss function TRL, the noise measure over the prediction horizon can be expressed for a given immission point 52.

In an embodiment the at least one noise measure is included in the optimization as one or more constraints. This inclusion may be made as an alternative to including the noise measure in the cost function itself, or it may be included as an addition to the noise measure in the cost function itself. This may depend on the specific implementation selected for the optimization problem.

In an embodiment, an optimization criteria used to optimize the at least one cost function is an optimization criterion to keep the noise measure under a predefined level. This may in embodiment be implemented by the cost function, by a properly set constraint, or by a combination of the two.

Typically, the optimization problem is formulated in terms of an objective function (a cost function) as well as a number of constraints (e.g., max/min limits, rate-of-change limits, etc.). When applying such a control scheme for normal operation, the objective function is typically formulated to provide a trade-off between noise level and power production, and with certain operating parameters such as rotor speed, pitch position and speed, and generator torque being governed by constraints.

In an example embodiment, the optimization problem used for normal production has the form:

$$u^*(t) = \mathrm{argmin}\, J_0(S(t), P(t), u(t)),$$

subject to the constraints:

$$\omega_R \leq \delta_{\omega_R}$$

$$-5 \leq \theta_i \leq 90, i \in \{1,2,3\}$$

$$-20 \leq \dot{\theta}_i \leq 20, i \in \{1,2,3\}$$

$$P_E \leq 3 \text{ MW}$$

$$L_{pA} \leq \text{noise limit}.$$

The function argmin is the standard mathematical operator which stands for argument of the minimum, and finds points in the parameter space spanned by S, P, u and t where the cost function $J_0$ attains its smallest value. The parameter $\Gamma_{\omega_R}$ denotes the rated rotor speed, $\theta_i$ the pitch angle (with derivative) and $P_E$ refers to the rated power of the turbine. A noise constraint is set in a manner where it is specified that the sound pressure should be below a given noise limit in a specified immission point. Such noise limit may be set as a legal threshold.

Here, the nominal cost function $J_0$ provides a trade-off between power (P) and loads (S) using the control signal u(t), while the constraints limit the rotor speed, blade pitch angle, blade pitch speed, electrical power and generated sound pressure over the prediction horizon. The control signal would typically consist of blade pitch angles and power reference for the converter:

$$u(t) = \begin{bmatrix} \theta_1(t) \\ \theta_2(t) \\ \theta_3(t) \\ P_{ref}(t) \end{bmatrix}$$

By implementing in the controller an MPC routine to calculate the control trajectory an optimization problem over N time steps (the control and prediction horizon) is solved.

As shown in connection with Eq. 1, the noise measure may be included into the cost function by use of a weight, $\rho$. The weight may be used as a sensitivity measure of the noise generated by a wind turbine. For example the weight may be correlated with a measured atmospheric condition, such as wind speed, rain, snow or other factors which influence noise propagation between the wind turbine an a given immission point. The weight may also be correlated with a measured background noise level, since wind turbine noise may be less disturbing if the background noise is high.

The weight may also be correlated with an estimated noise level determined by a wind turbine noise emission model. In this manner, if operational parameters are used which do not generate much noise, the weight may be set to be low or even zero in order not to take this into account in the control of the wind turbine. Alternatively, if the generated noise level is high or close to a given threshold, the weight may be set high to ensure that the wind turbine is operated accordingly.

In embodiments, the weight may be correlated with a function of the time of day and/or a date. In this manner the turbine may e.g. be set to generate more noise during day time or during working days where the environment may be less sensitive to the generated noise, and to generate less noise during night time or other times where the environment is more sensitive to the generated noise.

As shown in FIG. 5, the noise level may be set as a threshold 53 over the prediction horizon. Such threshold may be used as an optimization criterion to keep the generated sound pressure at or under a predefined level. In an embodiment, the predefined level is received as an input from an external source. Such external source may be an external microphone or an external unit which monitors the noise level or sensitivity to noise at an immission point. The immission points may be provided on a continuous basis for continuous adaptation to a real time noise situation at one or more immission points.

The predefined level may be variably set depending upon various parameters. For example the predefined level may be correlated with a function of the time of day and/or a date or with a measured background noise level.

In an embodiment, the noise measure may include one or more tonal components. For example the noise measure may take into account specific frequencies or amplitudes of the generated noise. For example, Eq. 2 may be formulated to include a tonal dependency. This may in general be done by a including a functional dependency between rotor speed and/or set pitch angle on generated noise level at a given frequency. However, it may also be implemented by weighing the noise measure with a given frequency profile to diminish the noise effect in certain frequency intervals and enhance the noise effect in other frequency intervals. In an embodiment, the turbine may also include a look-up table or similar which based on measured noise emissions provides a weight factor either to be combined with, or to replace, the shown weight factor $\rho$.

The wind turbine 1 may be included among a collection of other wind turbines belonging to a wind power plant 60, also referred to as a wind farm or wind park.

Figure 6:
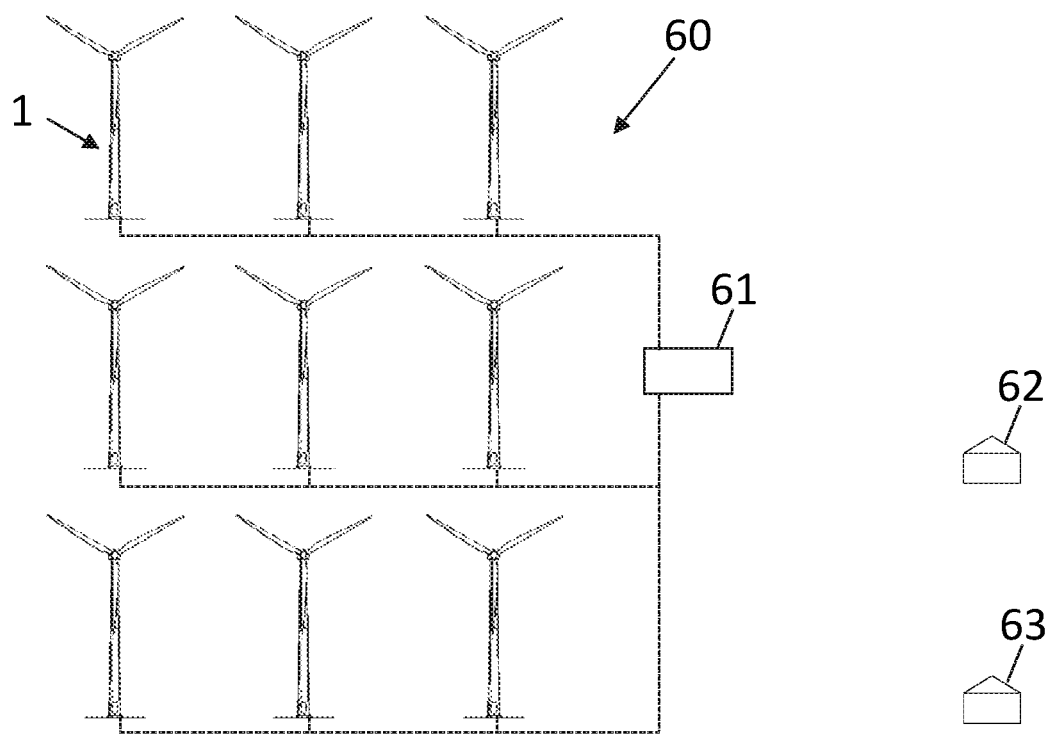
FIG. 6 schematically illustrates a wind power plant WPP.

FIG. 6 schematically illustrates a wind power plant WPP 60. In an embodiment of the invention, the wind power plant may be controlled by selecting at least one wind turbine of the plurality of wind turbines and based on the operational state of the selected wind turbine, calculate predicted operational trajectories, and determining at least one noise measure from the predicted operational trajectory of the selected wind turbine, and controlling the wind turbine accordingly. The selected turbine may be any, any group of, or all of the wind turbines in the wind power plant.

FIG. 6 shows two immission points 62, 63. The noise measure may be determined as an aggregate noise measure, such as an aggregate sound pressure, at a specified immission point. In this regard, in a first step, the sound power $L_{wA}$ may be determined for each wind turbine and in a second step, the transmission loss function may be used individually between each turbine and the immission point to determine an aggregate pressure at the selected immission point.

In an embodiment, the one or more predicted operational trajectories for the selected at least one wind turbine are calculated by optimizing at least one cost function, and wherein the at least one noise measure is included in the cost function and/or the at least one noise measure is included in the optimization as one or more constraints in a manner as described for a single turbine. By properly defined cost functions and/or properly set constraints, the operation of individual turbines in a wind park may continuously be adjusted in order to ensure specified noise levels in one or more immission points.

The optimization objective may be to optimize the output power of the wind power plant under the constraint that the sound pressure should be below legal thresholds for selected immission points. Like in the situation of a single turbine, the immission points may be externally supplied in a continuous manner from an external source for continuous adaptation to a real time noise situation at one or more immission points.

Figure 7:
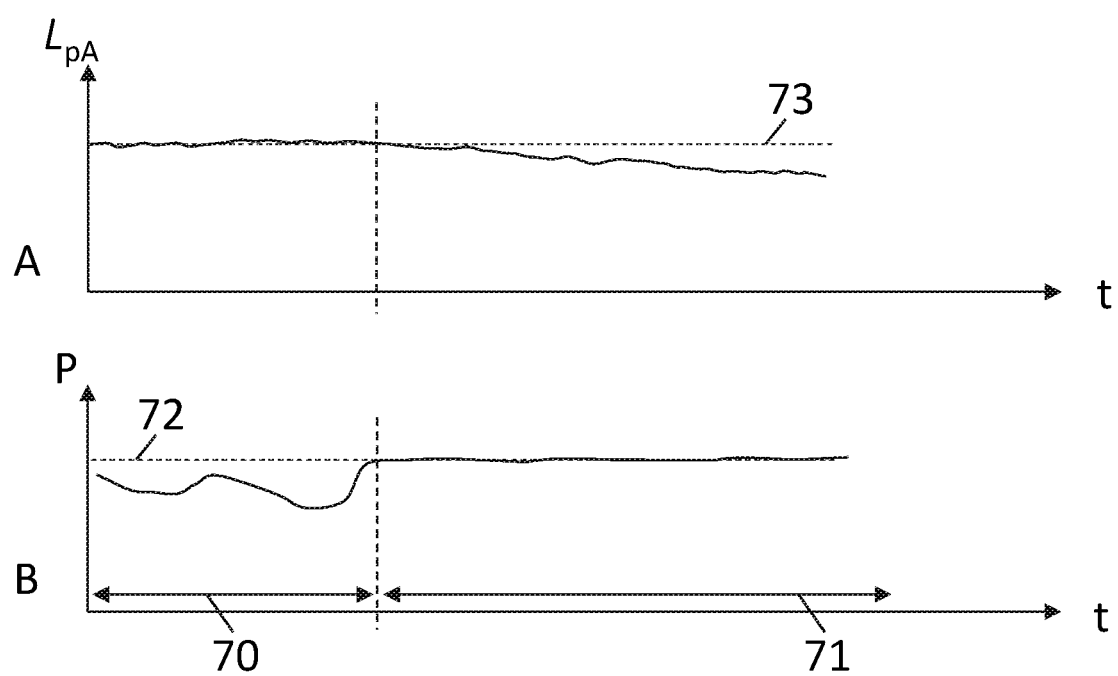
FIG. 7 illustrates an example of operation of a wind power plant in accordance with embodiments.

FIG. 7 illustrates a schematic example of operation of a wind power plant which achieves this optimization objective. The figure shows two time intervals 70, 71. In FIG. 7A, in the first time interval 70 a noise level, expressed as a sound pressure in a given immission point, is at a given threshold 73, whereas in the second time interval 71 the noise level falls below the threshold e.g. due to a wind direction change. FIG. 7B shows a possible effect on the output power P from the wind power plant from this. In the first time interval 70, at least some of the individual turbines are derated to ensure that the wind power plant does not exceed the threshold 73. This results in that the aggregate power level P in the first time period 70 is less than the rated power level 72. In the second time period 71, the sound pressure at the immission point falls below the specified threshold 73, and as a result the wind turbines can be operated at their rated output 72.

The figure thus illustrates a resulting trade-off between the output power and the generated which is the result of the optimization process.

The figure is also applicable for single turbine operation, with appropriate modifications.

In embodiments, the general aspects of the embodiments of the present invention may be implemented in a wind turbine power plant controller 61 arranged for controlling one or more wind turbines of a wind power plant. In such embodiment, the wind park controller may control one or more selected wind turbines. The wind turbine power plant controller may be implemented in a distributed manner, where parts of the controller are implemented in the wind turbine whereas other parts of the controller are implemented in the wind power plant controller.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method of controlling a wind turbine, the method comprising:
calculating at least one predicted operational trajectory based on a current operational state of the wind turbine, wherein the at least one predicted operational trajectory comprises a time series of at least one variable;
calculating at least one predicted noise measure based at least on the at least one predicted operational trajectory; and
controlling the wind turbine according to at least one control trajectory calculated based at least on the at least one predicted noise measure.

2. The method according to claim 1, wherein calculating the at least one predicted operational trajectory comprises: optimizing at least one cost function that includes the at least one predicted noise measure.

3. The method according to claim 1, wherein calculating that at least one predicted operational trajectory comprises:
optimizing at least one cost function,
wherein the at least one predicted noise measure is included as an optimization constraint.

4. The method according to claim 1,
wherein the at least one predicted operational trajectory is a receding horizon trajectory with a prediction horizon, and
wherein the at least one predicted noise measure is determined for the prediction horizon.

5. The method according to claim 1, wherein the at least one predicted operational trajectory is calculated by using a model predictive control (MPC) routine.

6. The method according to claim 1, wherein the at least one predicted noise measure is calculated by a wind turbine noise emission model that predicts noise of the wind turbine as a function of one or more operational parameters over a prediction horizon.

7. The method according to claim 6, wherein the wind turbine noise emission model is configured to calculate a noise level at a specified immission point.

8. The method according to claim 2, wherein the cost function comprises a weighted element including the at least one predicted noise measure.

9. The method according to claim 8, wherein a weight of the weighted element is correlated with one of a measured atmospheric condition and a measured background noise level.

10. The method according to claim 8, wherein a weight of the weighted element is correlated with an estimated noise level determined by a wind turbine noise emission model.

11. The method according to claim 8, wherein a weight of the weighted element is correlated with a function of one or both of a time of day and a date.

12. The method according to claim 3, wherein the optimization constraint comprises maintaining the at least one predicted noise measure less than or equal to a predefined level.

13. The method according to claim 12, wherein the predefined level is received as an input from an external source.

14. The method according to claim 12, wherein the predefined level is correlated with one of:
a function of one or both of a time of day and a date; and
a measured background noise level.

15. The method according to claim 1, wherein the at least one predicted noise measure includes one or more tonal components.

16. A method of controlling a wind power plant comprising a plurality of wind turbines, the method comprising:
calculating, based on a current operational state of a selected wind turbine of the plurality of wind turbines, one or more predicted operational trajectories for the selected wind turbine, wherein the one or more predicted operational trajectories comprise a time series of at least one variable;
calculating at least one predicted noise measure using at least one of the one or more predicted operational trajectories; and
controlling the selected wind turbine according to at least one control trajectory calculated based at least on the at least one predicted noise measure.

17. The method according to claim 16,
wherein the at least one predicted noise measure comprises an aggregate noise measure that is determined for a specified immission point based on a plurality of noise measures determined for individual wind turbines of the plurality of wind turbines.

18. The method according to claim 16, wherein calculating the one or more predicted operational trajectories comprises:
optimizing at least one cost function,
wherein the at least one predicted noise measure is one or both of:
included in the cost function, and
included as an optimization constraint.

19. A control system for a wind turbine, the control system comprising:
a controller configured to:
receive a current operational state of the wind turbine;
calculate, based on the current operational state, one or more predicted operational trajectories comprising a time series of at least one variable;
calculate at least one predicted noise measure based at least on at least one predicted operational trajectory of the one or more predicted operational trajectories;
calculate a control trajectory based at least on the at least one predicted noise measure; and
control the wind turbine based on the control trajectory.

* * * * *